US012688221B2

(12) United States Patent
Srinivasa et al.

(10) Patent No.: US 12,688,221 B2
(45) Date of Patent: Jul. 21, 2026

(54) CREATING EXPLAINABLE SUMMARIES OF TEXT DOCUMENTS WITH CONTROLLABLE LEVELS OF DETAIL

(71) Applicant: Cisco Technology, Inc., San Jose, CA (US)

(72) Inventors: Jayanth Srinivasa, San Jose, CA (US); Ali Payani, Santa Clara, CA (US); Ramana Rao V. R. Kompella, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 18/242,933

(22) Filed: Sep. 6, 2023

(65) Prior Publication Data

US 2025/0077562 A1     Mar. 6, 2025

(51) Int. Cl.
   *G06F 16/34*       (2019.01)
   *G06F 16/338*      (2019.01)
   *G06F 40/106*      (2020.01)
   *G06F 40/289*      (2020.01)

(52) U.S. Cl.
   CPC .......... *G06F 16/345* (2019.01); *G06F 16/338* (2019.01); *G06F 40/106* (2020.01); *G06F 40/289* (2020.01)

(58) Field of Classification Search
   CPC .... G06F 16/345; G06F 16/338; G06F 40/289; G06F 40/106
   See application file for complete search history.

(56) References Cited

U.S. PATENT DOCUMENTS

| | | | | |
|---|---|---|---|---|
| 2006/0265666 A1* | 11/2006 | Bornstein | ............. | G06F 40/253 |
| | | | | 715/776 |
| 2014/0250375 A1* | 9/2014 | Malik | ................... | G06F 16/345 |
| | | | | 715/254 |
| 2016/0048511 A1* | 2/2016 | Bhagwat | ............... | G06F 16/313 |
| | | | | 707/755 |
| 2016/0350412 A1* | 12/2016 | Donato | ............... | G06F 16/3329 |
| 2017/0277668 A1* | 9/2017 | Luo | ....................... | G06F 16/345 |
| 2017/0280208 A1* | 9/2017 | Mishra | .................... | G06F 18/29 |
| 2019/0042551 A1* | 2/2019 | Hwang | .................. | G06V 10/82 |
| 2020/0090659 A1* | 3/2020 | Castelli | ................... | G06F 16/48 |
| 2020/0257757 A1* | 8/2020 | Chawla | ................. | G06F 16/345 |

(Continued)

FOREIGN PATENT DOCUMENTS

WO      2022093271      5/2022

OTHER PUBLICATIONS

Shiao, et al., "KI2TE: Knowledge-Infused InterpreTable Embeddings for COVID-19 Misinformation Detection", KnOD'21 Workshop—Apr. 14, 2021, 6 pages.

(Continued)

*Primary Examiner* — Mahelet Shiberou
(74) *Attorney, Agent, or Firm* — Lee & Hayes, P.C.

(57) ABSTRACT

In one implementation, a device receives relevancy parameters from a user interface indicative of how relevant different portions of a text document are to a user. The device segments the text document into segments based on the relevancy parameters. The device generates a summary of the text document using the segments. The device provides, to the user interface, the summary of the text document and an indication of how much each of the segments contributed to the summary.

20 Claims, 6 Drawing Sheets

(56) References Cited

U.S. PATENT DOCUMENTS

| 2021/0141790 A1* | 5/2021 | Narth | ..................... G06F 16/345 |
| 2021/0193127 A1 | 6/2021 | Kang et al. | |
| 2022/0358381 A1 | 11/2022 | Cmielowski et al. | |
| 2023/0168639 A1 | 6/2023 | Carullo et al. | |
| 2023/0297765 A1* | 9/2023 | Vendrow | ............. G10L 15/1815 |
| | | | 704/251 |

OTHER PUBLICATIONS

Norkute, et al., "Towards Explainable AI: Assessing the Usefulness and Impact of Added Explainability Features in Legal Document Summarization", CHI '21 Extended Abstracts, May 8-13, 2021, 7 pages, Yokohama, Japan.
Ezukwoke, et al., "Leveraging Pre-trained Models for Failure Analysis Triplets Generation", arXiv:2210.17497v1 [cs.CL] Oct. 31, 2022, 33 pages.

* cited by examiner

400

ASKI  John D.

Explainable Summarizer

Selected doc : Red.riding-hood.txt 402

Reviews :

404

406

Summary

Relevancy

Word  Paragraph

408

Relevancy Th: [80] % 410

CREATING EXPLAINABLE SUMMARIES OF TEXT DOCUMENTS WITH CONTROLLABLE LEVELS OF DETAIL

TECHNICAL FIELD

The present disclosure relates generally to computer networks, and, more particularly, to creating explainable summaries of text documents with controllable levels of detail.

BACKGROUND

With recent advancements in artificial intelligence, it now becomes possible to use deep learning networks to generate summaries of large bodies of text in an unsupervised manner. For instance, a language model could ingest an entire book and produce a summary of the entire book on the order of several paragraphs. More advanced models are even able to ingest multiple documents at once, to produce a unified summary of them.

However, one downside to current text summarization systems is that the end user has no insight into which portions of the original document were used to form the summary, nor whether the summary covers the entire document. Indeed, many text summarization systems rely on deep learning, which is an approach that uses an artificial neural network with multiple layers, one or more of which is considered to be 'hidden.' Consequently, this means that there is little insight as to how the model makes its decisions.

DESCRIPTION OF EXAMPLE IMPLEMENTATIONS

Overview

Figure 1A:
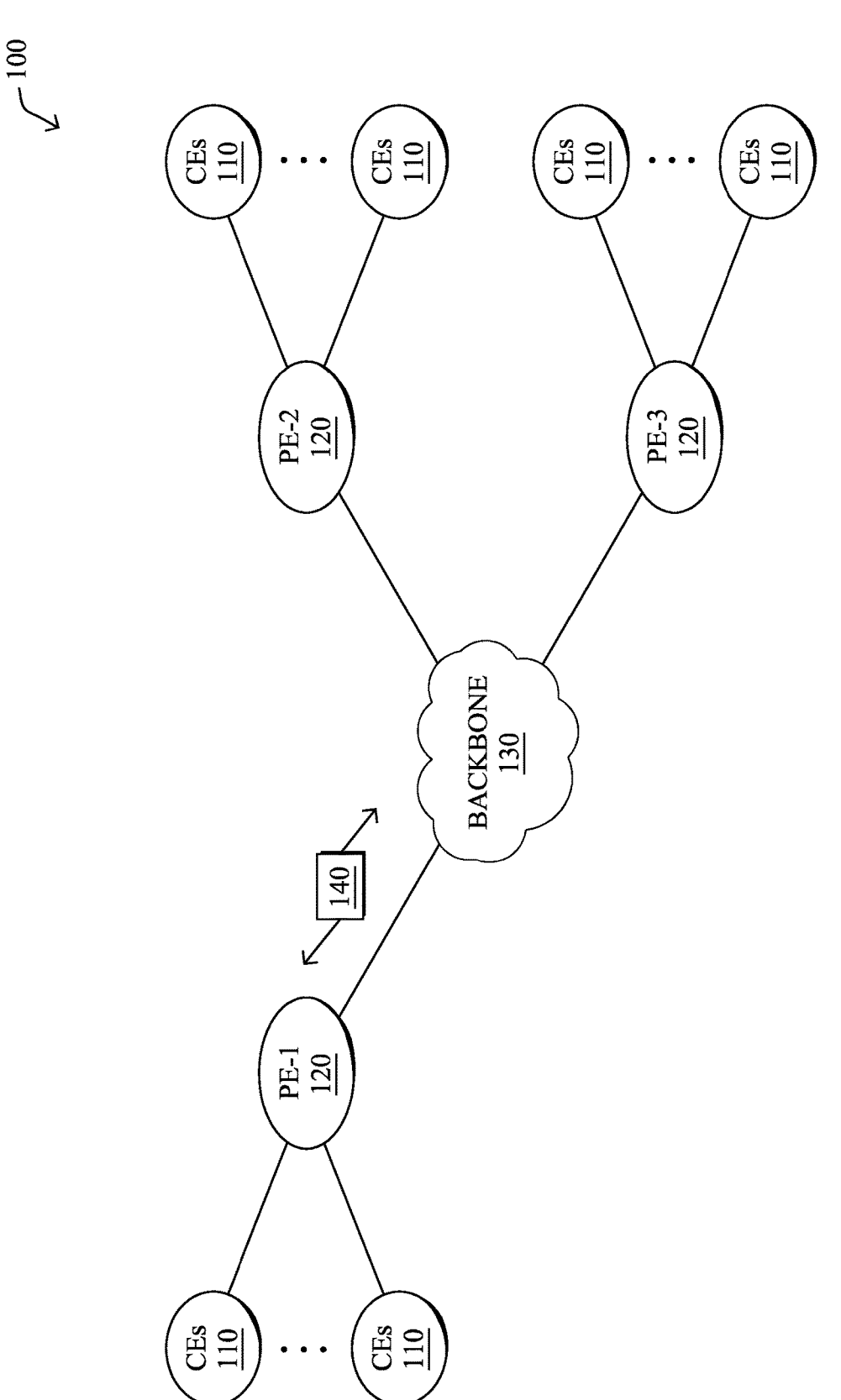
FIGS. 1A-1B illustrate an example communication network.

According to one or more implementations of the disclosure, a device receives relevancy parameters from a user interface indicative of how relevant different portions of a text document are to a user. The device segments the text document into segments based on the relevancy parameters. The device generates a summary of the text document using the segments. The device provides, to the user interface, the summary of the text document and an indication of how much each of the segments contributed to the summary.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
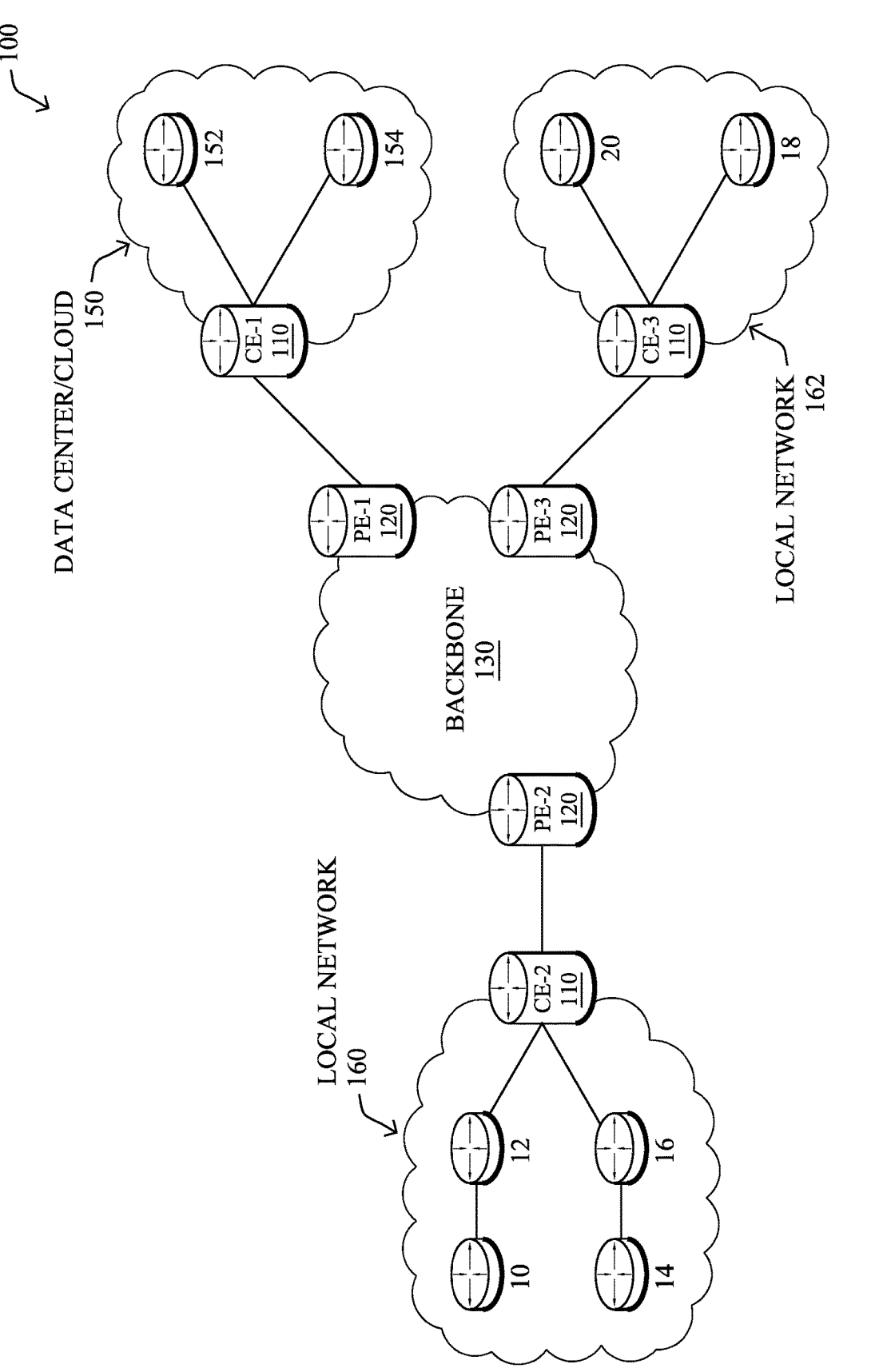

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

Figure 2:
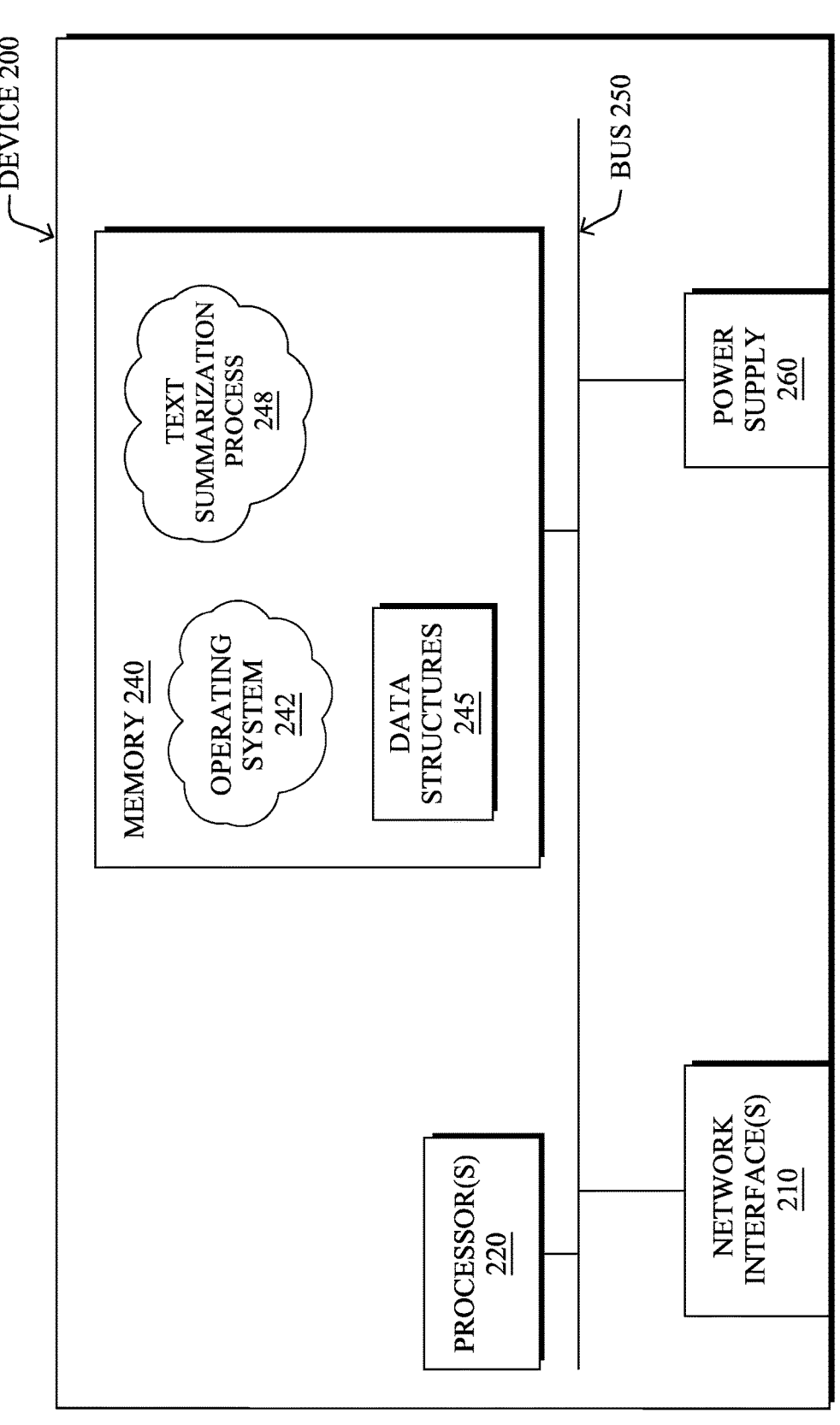
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a text summarization process 248, as described herein.

It will be apparent to those skilled in the art that other processor and memory types, including various computer-readable media, may be used to store and execute program instructions pertaining to the techniques described herein and cause the executing device to perform the techniques herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various implementations, text summarization process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, text summarization process 248 may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that text summarization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, or the like.

In further implementations, text summarization process 248 may also include one or more generative artificial intelligence/machine learning models. In contrast to discriminative models that simply seek to perform pattern matching for purposes such as anomaly detection, classification, or the like, generative approaches instead seek to generate new content or data (e.g., audio, video/images, text, etc.), based on an existing body of training data. Example generative approaches can include, but are not limited to, generative adversarial networks (GANs), large language models (LLMs), other transformer models, and the like.

As noted above, with recent advancements in artificial intelligence, it now becomes possible to use deep learning networks to generate summaries of large bodies of text in an unsupervised manner. For instance, a language model could ingest an entire book and produce a summary of the entire book on the order of several paragraphs. More advanced models are even able to ingest multiple documents at once, to produce a unified summary of them.

However, one downside to current text summarization systems is that the end user has no insight into which portions of the original document were used to form the summary, nor whether the summary covers the entire document. Indeed, many text summarization systems rely on deep learning, which is an approach that uses an artificial neural network with multiple layers, one or more of which is considered to be 'hidden." Consequently, this means that there is little insight as to how the model makes its decisions.

Creating Explainable Summaries of Text Documents with Controllable Levels of Detail The techniques herein allow for the generation of summaries of text documents in a manner that is explainable to an end user. In some aspects, the techniques herein may indicate to the user which portions of a text document contributed to a particular portion of its summary. In further aspects, the techniques herein also introduce a user interface that allows the user to adjust the summary by specifying a relevancy of a given portion of the document. In turn, the system may adjust how it segments the portion of the document for summarization based on how relevant the user believes it to be.

Specifically, according to one or more implementations, a device receives relevancy parameters from a user interface indicative of how relevant different portions of a text document are to a user. The device segments the text document into segments based on the relevancy parameters. The device generates a summary of the text document using the segments. The device provides, to the user interface, the summary of the text document and an indication of how much each of the segments contributed to the summary.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Operationally, a key observation herein is that using a static segmentation approach when summarizing a text document can lead to a less than optimal summary of that document. Indeed, even in one paragraph, there can be many unrelated topics of discussion, particularly over a long paragraph. In this case, segmenting the text document at the paragraph level can lead to the resulting summary focusing on only one of the topics that is present in the paragraph. To address this, the techniques herein introduce a text summarization system that is able to generate a summary based on certain segments in the textual input that provide a coherent and homogeneous meaning.

Figure 3:
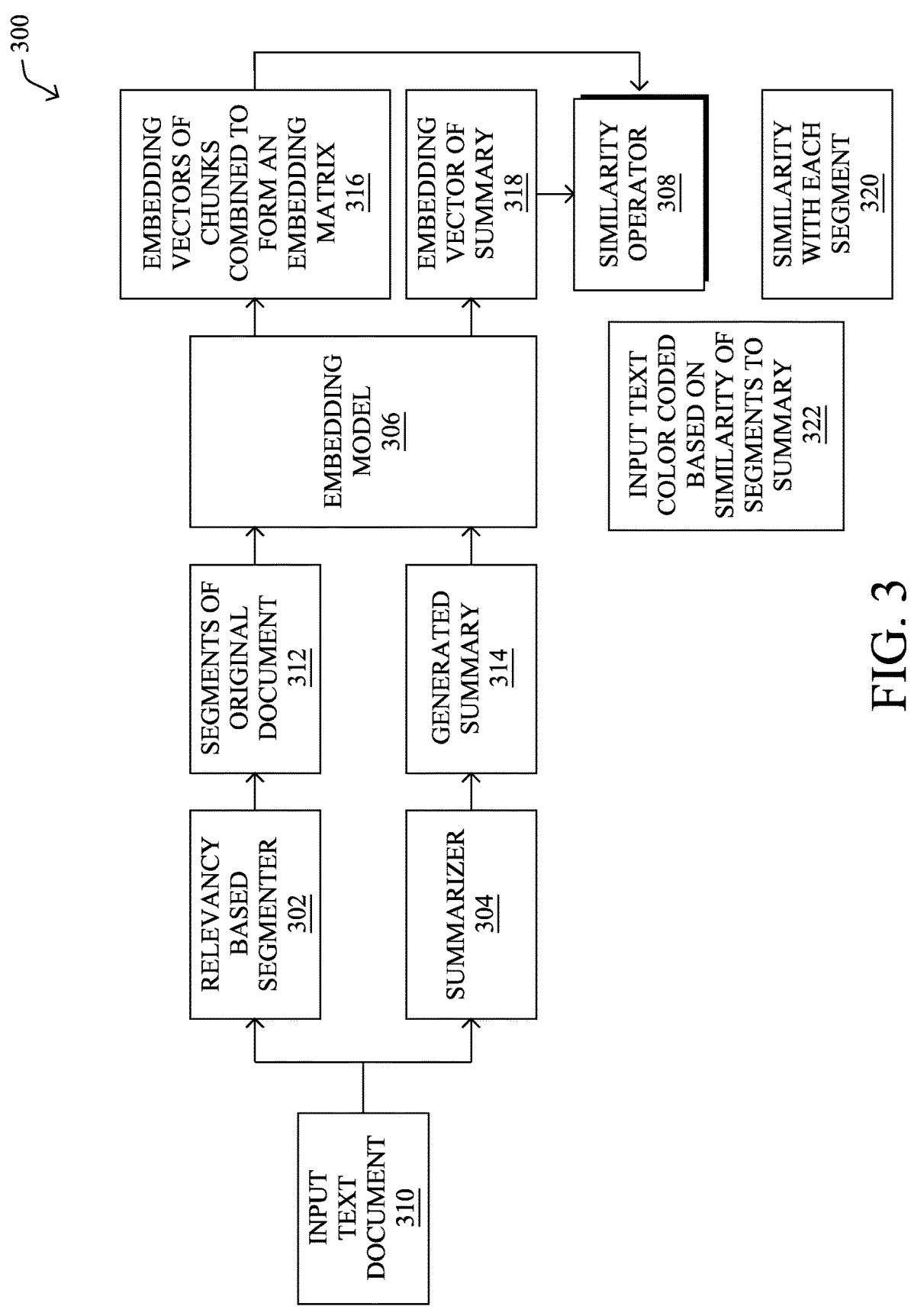
FIG. 3 illustrates an example architecture for creating explainable summaries of text documents with controllable levels of detail.

FIG. 3 illustrates an example architecture 300 for creating explainable summaries of text documents with controllable levels of detail, in various implementations. As shown, architecture 300 may be used to implement text summarization process 248 as a set of software components: a relevancy based segmenter 302, a summarizer 304, an embedding model 306, and a similarity operator 308. As would be appreciated, these components may be executed by a singular device or in a distributed manner, in which case the distributed devices may be viewed as a singular device for purposes of executing text summarization process 248. In addition, while these components are described herein separately, further implementations provide for their functionalities to be combined or omitted, as desired.

As shown, relevancy based segmenter 302 may begin by assessing an input text document 310 at a predefined level of granularity, such as on a per-sentence basis. In turn, relevancy based segmenter 302 may continue to add sentences from text document 310 in a greedy fashion until the new candidate sentence is not considered relevant.

For the current segment, relevancy based segmenter 302 may use a beam search algorithm, to assess the relevancy of each word in the next sentence. In turn, relevancy based segmenter 302 may use the average relevancy for the whole sentence to decide whether to end the current segment and start a new segment. For instance, relevancy based segmenter 302 may compare that relevancy to a defined relevancy threshold, to make this determination.

For instance, consider the following text:

"Markov Logic Networks (MLNs), which elegantly combine logic rules and probabilistic graphical models, can be used to address many knowledge graph problems. However, inference in MLN is computationally intensive, making the industrial scale application of MLN very difficult.

In recent years, graph neural networks (GNNs) have emerged as efficient and effective tools for large-scale graph problems. Nevertheless, GNNs do not explicitly incorporate prior logic rules into the models, and may require many labeled examples for a target task"

Given the above text, if relevancy based segmenter 302 determines that its relevancy score is 0, it may consider the entire portion of text as being only one segment. However, if the relevancy score for the above text is a maximum value of 1, relevancy based segmenter 302 may instead split the portion of text into two segments: a first segment regarding the Markov Logic Networks and another segment regarding the Graph Neural Networks. Of course, the relevancy score may be implemented on a different scale than that of 0-1, as desired, as well.

Once relevancy based segmenter 302 has identified the segments 312 of input text document 310, summarizer 304 may perform summarization on those segments, to generate a summary 314 of input text document 310. In some implementations, summarizer 304 may do so using a deep learning model. In further implementations, summarizer 304 may do so using another text summarization approach. As would be appreciated, though, summarizer 304 may lack any explainability as to which segments contributed to any given portion of summary 314.

In some instances, to provide some explainability regarding summary 314, text summarization process 248 may convert both the segments 312 of input text document 310, which are relevancy-based, and the summary 314 of input text document 310 generated by summarizer 304 into vector representations using the same embedding model 306. For instance, embedding model 306 may take the form of Bidirectional Encoder Representations from Transformers (BERT), Sentence-BERT (S-BERT), or other suitable embedding model.

In turn, similarity operator 308 may determine the normalized, pairwise similarities of the embedding vector 318 of summary 314 to the embedding vectors 316 from segments 312, to generate a similarity vector 320 that represents the similarity score of summary 314 to a particular segment of input text document 310. The system may then use similarity vector 320 to provide an indication as to the degree of similarity between any given segment of input text document 310 to summary 314. For instance, the system may present a preview of input text document 310, summary 314, and/or an indication of the similarity to a user interface for review. In some instances, the indication may take the form of a highlighting 322 or other visual indicia (e.g., coloration, symbol, etc.) that conveys the degree of similarity between any given portion of input text document 310 and summary 314.

Figure 4:
FIG. 4 illustrates an example user interface for a text summarization system.

FIG. 4 illustrates an example user interface 400 for a text summarization system, such as one implemented using architecture 300 in FIG. 3. As shown, user interface 400 may include an option 402 to select an input text document or set of text documents. In turn, the system may generate both a preview 404 of the input text document and a summary 406 of the input text document.

In various implementations, user interface 400 may also display an indication as to how similar a portion of summary 406 is to one or more segments of the input document shown in preview 404. For instance, user interface 400 may highlight a word, set of words, sentence, or paragraph in summary 406 and highlight those corresponding word(s), sentence(s), or paragraph(s) in preview 404 that have sufficiently high similarity scores, indicating to the user that the highlighted portion of 406 was derived from the highlighted portion(s) of the document shown in preview 404.

In some implementations, user interface 400 may further indicate the current relevancy score 408 assigned to the portion of the input text document shown in preview 404. As noted previously, the system may base its segmentation of that portion of the document on its associated relevancy score, such as by assigning different sentences to different segments or an entire paragraph to a singular segment.

As shown, in various instances, the user of user interface 400 may opt to regenerate summary 406 through the input of a new relevancy score 408. For instance, user interface 400 may allow the user to enter a new numeric value, adjust a slider bar (as shown), or use any other form of input, to control the relevancy and segmentation of the portion of the input text document. In addition, in some cases, user interface 400 may also allow the user to control the relevancy threshold 410 that relevancy based segmenter 302 uses to decide when a given segment has ended.

Figure 5:
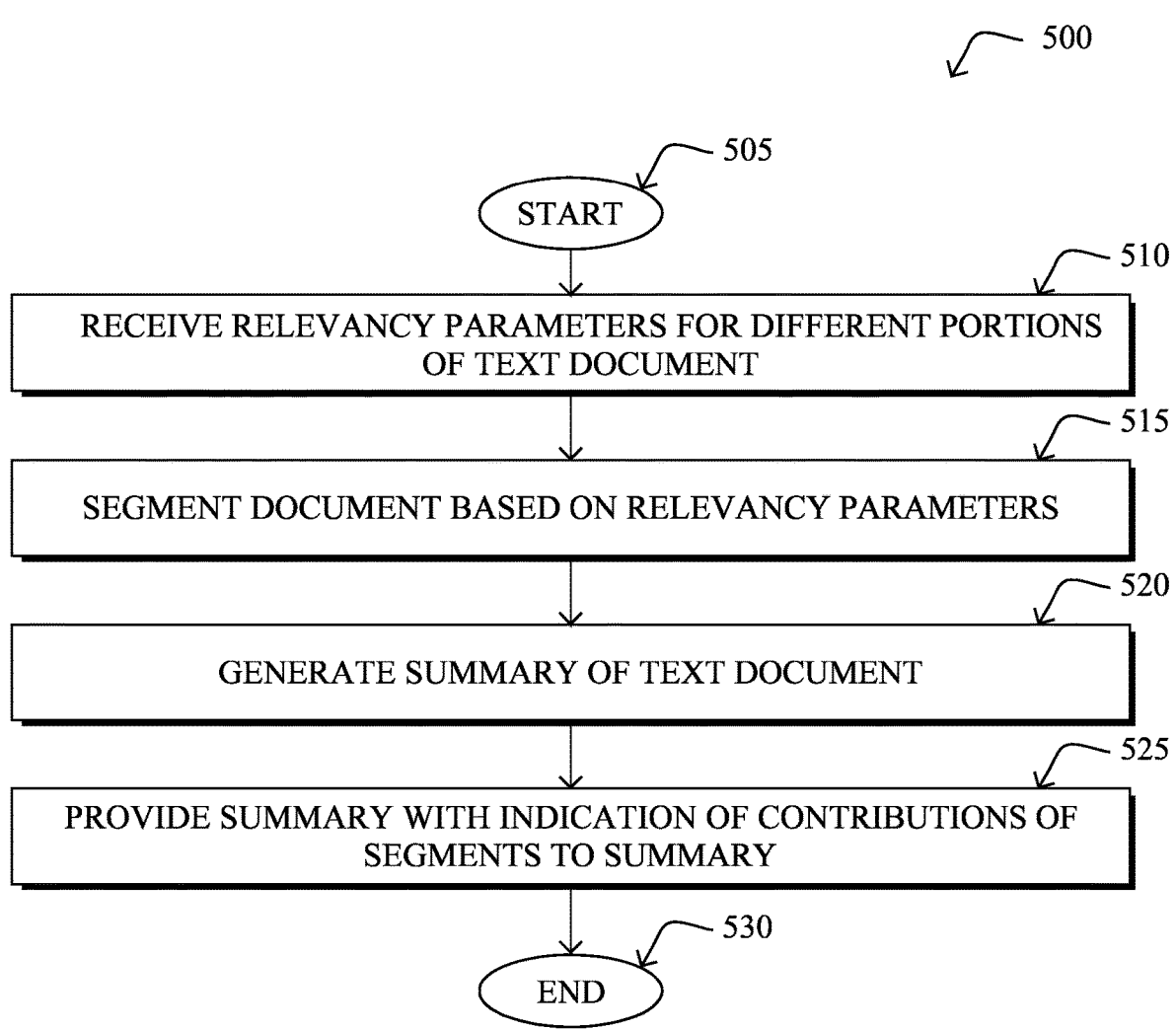
FIG. 5 illustrates an example simplified procedure for creating explainable summaries of text documents with controllable levels of detail.

FIG. 5 illustrates an example simplified procedure (e.g., a method) for creating explainable summaries of text documents with controllable levels of detail, in accordance with one or more implementations described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may receive relevancy parameters from a user interface indicative of how relevant different portions of a text document are to a user. In some cases, the device receives the relevancy parameters from the user interface after generating and presenting an initial summary of the text document to the user interface.

At step 515, as detailed above, the device may segment the text document into segments based on the relevancy parameters. In various implementations, the device may determine whether a particular portion of the text document should be segmented by per paragraph or per sentence based on a relevancy parameter associated the particular portion of the text document. In some implementations, the segments are further based on a relevancy threshold. In one implementation, the device may receive, via the user interface, the relevancy threshold.

At step 520, the device may generate a summary of the text document using the segments, as described in greater detail above. In one implementation, the device uses deep learning to generate the summary of the text document. In some implementations, the device uses an embedding model to generate the indication of how much each of the segments contributed to the summary of the text document.

At step 525, as detailed above, the device may provide, to the user interface, the summary of the text document and an indication of how much each of the segments contributed to the summary. In some implementations, the device may also provide, to the user interface, a preview of the text document for presentation in conjunction with the summary. In such a case, the indication may comprise a highlighting of a given segment in the preview that matches a highlighting of a portion of the summary to which it contributed. In various implementations, the device may also generate the indication in part by computing a pairwise similarity between a particular segment of the text document to a portion of the summary.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for creating explainable summaries of text documents with controllable levels of detail, it is to be understood that various other adaptations and modifications may be made within the spirit and scope of the implementations herein. For example, while certain implementations are described herein with respect to using certain models for purposes of anomaly detection, the models are not limited as such and may be used for other functions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method comprising:
   presenting a user interface;
   receiving, by a device, a parameter from the user interface that is provided by a user and indicative of a level of granularity for segmentation;
   segmenting, by the device, a text document into segments based on the parameter;
   generating, by the device, a summary of the text document using the segments and an Artificial Intelligence model;
   generating, using an embedding model, a first embedding representation for a first segment of the segments;
   generating a second embedding representation for the summary;
   determining a degree of similarity of the first segment to the summary based on a comparison of the first embedding representation to the second embedding representation; and
   providing, by the device and to the user interface, the summary of the text document and an indication representing the degree of similarity of the first segment to the summary.

2. The method as in claim 1, further comprising:
   providing, to the user interface, a preview of the text document for presentation in conjunction with the summary.

3. The method as in claim 2, wherein the indication comprises a highlighting of the first segment and a highlighting of a portion of the summary to which the first segment contributed.

4. The method as in claim 1, wherein the segmenting is further based on a relevancy threshold.

5. The method as in claim 4, further comprising:
   receiving, via the user interface, the relevancy threshold.

6. The method of claim 1, wherein the level of granularity includes sentence level or paragraph level.

7. The method of claim 1, wherein the providing the indication includes presenting text from the text document that corresponds to the first segment, a first visual representation to emphasize the text, and a second visual representation to emphasize a portion of the summary related to the first segment.

8. The method of claim 1, further comprising:
   presenting an initial summary of the text document prior to receiving the parameter.

9. An apparatus, comprising:
   one or more network interfaces;
   a processor coupled to the one or more network interfaces; and
   a memory configured to store one or more instructions, that when executed by the processor, configure the processor to:
   present a user interface;
   receive a parameter from the user interface that is provided by a user and indicative of a level of granularity for segmentation;
   segment a text document into segments based on the parameter;
   generate a summary of the text document using the segments;
   generate, using an embedding model, a first embedding representation for a first segment of the segments;
   generate a second embedding representation for the summary;
   determine a degree of similarity of the first segment to the summary based on the first embedding representation and the second embedding representation; and
   provide, to the user interface, the summary of the text document and an indication of the degree of similarity of the first segment to the summary.

10. The apparatus as in claim 9, wherein the processor is further configured to:
    provide, to the user interface, a preview of the text document for presentation in conjunction with the summary.

11. The apparatus as in claim 10, wherein the indication comprises a highlighting of the first segment and a highlighting of a portion of the summary to which the first segment contributed.

12. The apparatus as in claim 9, wherein the processor is configured to segment the text document based on a relevancy threshold.

13. The apparatus as in claim 12, wherein the processor is further configured to:
    receive, via the user interface, the relevancy threshold.

14. The apparatus of claim 9, wherein the level of granularity includes sentence level or paragraph level.

15. The apparatus of claim 9, wherein the processor is configured to provide the indication by presenting text from the text document that corresponds to the first segment, a first visual representation to emphasize the text, and a second visual representation to emphasize a portion of the summary related to the first segment.

16. The apparatus of claim 9, wherein the processor is further configured to:

present an initial summary of the text document prior to receiving the parameter.

17. A tangible, non-transitory, computer-readable medium storing program instructions that cause a device to execute a process comprising:

presenting a user interface;

receiving a parameter from the user interface that is provided by a user and indicative of a level of granularity for segmentation;

segmenting a text document into segments based on the parameter;

generating a summary of the text document using the segments;

generating, using an embedding model, a first embedding representation for a first segment of the segments;

generating a second embedding representation for the summary;

determining a degree of similarity of the first segment to the summary based on a comparison of the first embedding representation to the second embedding representation; and providing, to the user interface, the summary of the text document and an indication of the degree of similarity of the first segment to the summary.

18. The tangible, non-transitory, computer-readable medium of claim 17, wherein the level of granularity includes sentence level or paragraph level.

19. The tangible, non-transitory, computer-readable medium of claim 17, wherein the providing the indication includes presenting text from the text document that corresponds to the first segment, a first visual representation to emphasize the text, and a second visual representation to emphasize a portion of the summary related to the first segment.

20. The tangible, non-transitory, computer-readable medium of claim 17, wherein the process further comprises:

presenting an initial summary of the text document prior to receiving the parameter.

* * * * *